(12) United States Patent  
O'Malley et al.

(10) Patent No.: US 9,387,420 B2
(45) Date of Patent: Jul. 12, 2016

(54) SCREEN DEVICE AND DOWNHOLE SCREEN

(75) Inventors: Edward J. O'Malley, Houston, TX (US); Brad G. Baker, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 525 days.

(21) Appl. No.: 12/758,414

(22) Filed: Apr. 12, 2010

(65) Prior Publication Data

US 2011/0247801 A1 Oct. 13, 2011

(51) Int. Cl.
*E21B 43/08* (2006.01)
*B01D 29/15* (2006.01)
*E21B 17/10* (2006.01)
*E21B 47/01* (2012.01)

(52) U.S. Cl.
CPC ............ *B01D 29/15* (2013.01); *E21B 17/1035* (2013.01); *E21B 43/082* (2013.01); *E21B 47/01* (2013.01); *B01D 2201/06* (2013.01)

(58) Field of Classification Search
CPC .... B01D 29/15; B01D 2201/06; E21B 43/08; E21B 43/082; E21B 17/1035; E21B 47/01; E21B 33/127
USPC .................... 166/56, 157, 227, 228
See application file for complete search history.

(56) References Cited

U.S. PATENT DOCUMENTS

| 1,352,493 | A | 9/1920 | Wolffgram |
| 3,371,793 | A | 3/1968 | Fowler |
| 4,260,096 | A | 4/1981 | Samarynov et al. |
| 4,924,568 | A | 5/1990 | Sato et al. |
| 5,032,622 | A | 7/1991 | Herrington et al. |
| 5,049,591 | A | 9/1991 | Hayashi et al. |
| 5,098,776 | A | 3/1992 | Kobayashi et al. |
| 5,501,832 | A | 3/1996 | Adams |
| 5,503,784 | A | 4/1996 | Balk |
| 5,520,758 | A | 5/1996 | Kelman et al. |
| 5,533,370 | A | 7/1996 | Kuroda et al. |
| 5,565,049 | A | 10/1996 | Simmons et al. |

(Continued)

FOREIGN PATENT DOCUMENTS

WO  2004099560 A1  11/2004

OTHER PUBLICATIONS

Notification of Transmittal of the International Search Report and the Written Opinion of the International Searching Authority, PCT/US2011/031768; Mailed Sep. 30, 2011; Korean Intellectual Property Office.

(Continued)

*Primary Examiner* — Brad Harcourt
(74) *Attorney, Agent, or Firm* — Cantor Colburn, LLP

(57) ABSTRACT

A screen device includes a foam body having a passageway that extends longitudinally through the foam body, the foam body has an open cell structure such that at least two surfaces of the foam body are in fluidic communication with one another through the foam body.

19 Claims, 2 Drawing Sheets

(56) References Cited

U.S. PATENT DOCUMENTS

| | | | |
|---|---|---|---|
| 5,770,016 A | 6/1998 | Greve | |
| 5,964,798 A | 10/1999 | Imran | |
| 6,281,289 B1 | 8/2001 | Maugans et al. | |
| 6,321,503 B1 | 11/2001 | Warren | |
| 6,388,043 B1 | 5/2002 | Langer et al. | |
| 6,472,449 B1 | 10/2002 | Heinemann et al. | |
| 6,521,555 B1 | 2/2003 | Bodaghi et al. | |
| 6,560,942 B2 | 5/2003 | Warren et al. | |
| 6,583,194 B2 | 6/2003 | Sendijarevic | |
| 6,817,441 B2 | 11/2004 | Murakami et al. | |
| 6,827,764 B2 | 12/2004 | Springett et al. | |
| 6,983,796 B2 * | 1/2006 | Bayne et al. | 166/278 |
| 6,986,855 B1 | 1/2006 | Hood et al. | |
| 7,048,048 B2 | 5/2006 | Nguyen et al. | |
| 7,134,501 B2 | 11/2006 | Johnson et al. | |
| 7,155,872 B2 | 1/2007 | Francom | |
| 7,234,518 B2 * | 6/2007 | Smith | 166/227 |
| 7,644,773 B2 | 1/2010 | Richard | |
| 7,712,529 B2 | 5/2010 | Dusterhoft et al. | |
| 7,828,055 B2 | 11/2010 | Willauer et al. | |
| 2005/0056425 A1 | 3/2005 | Grigsby et al. | |
| 2005/0205263 A1 | 9/2005 | Richard | |
| 2008/0006413 A1 | 1/2008 | Le Gloahec et al. | |
| 2008/0296020 A1 | 12/2008 | Willauer | |

OTHER PUBLICATIONS

J. Heiland et al., "The Role of the Annular Gap in Expandable Sand Screen Completions"; Society of Petroleum Engineers; SPE Paper No. 86463; Feb. 18-20, 2004.

Lorrie A. Krebs et al., "Pitting Resistance of Nitinol Stents Before and After Implantation"; NACE International; Paper No. 09461; Corrosion Conference and Expo Mar. 22-26, 2009.

G. Scott Lester et al., "Field Application of a New Cleanable and Damage Tolerant Downhole Screen,"; Society of Petroleum Engineers, SPE Paper No. 30132, May 15, 1995.

Jiaxing (Jason) Ren et al., "Studying the Effect of Chemical Aging on the Properties of a Shape Memory Material", Offshore Technology Conference, Paper No. OTC 21317; May 2, 2011.

Witold M. Sokolowski et al., "Cold hibernated elastic memor(yC HEM) self-deployable structures"; Jet Propulsion Laboratory, California Institute of Technology, Mar. 1, 1999.

SPE Distinguished Lecturer Series[online]; retrieved on Sep. 25, 2009]; retrieved from the internet at: http://www.spe.org/spe-site/spe/spe/events/dl/Ott.pdf.

C.F. Williams et al., "A New Sizing Criterion for Conformable and Nonconformable Sand Screens Based on Uniform Pore Structures"; Society of Petroleum Engineers, SPE Paper No. 98235; Feb. 15-17, 2006.

* cited by examiner

SCREEN DEVICE AND DOWNHOLE SCREEN

BACKGROUND

Screens are commonly used in tubular systems to separate particulate from fluids. Such systems are employed in the downhole completion industry to separate sand and other particulate from hydrocarbons such as oil, water and natural gas, for example. Communication across these screens can be difficult depending upon the construction of the screen itself. Screen devices that simplify communication thereacross are welcomed in the art.

BRIEF DESCRIPTION

Disclosed herein is a screen device that includes a foam body having a passageway that extends longitudinally through the foam body. The foam body has an open cell structure such that at least two surfaces of the foam body are in fluidic communication with one another through the foam body.

Further disclosed is a downhole screen including a tubular having a wall with perforations therethrough and a foam body, having an open cell structure, surroundingly disposed at the tubular. The open cell structure provides fluidic communication between an outer surface of the foam body and an inside of the tubular. The foam body also has a conduit extending longitudinally therethrough.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
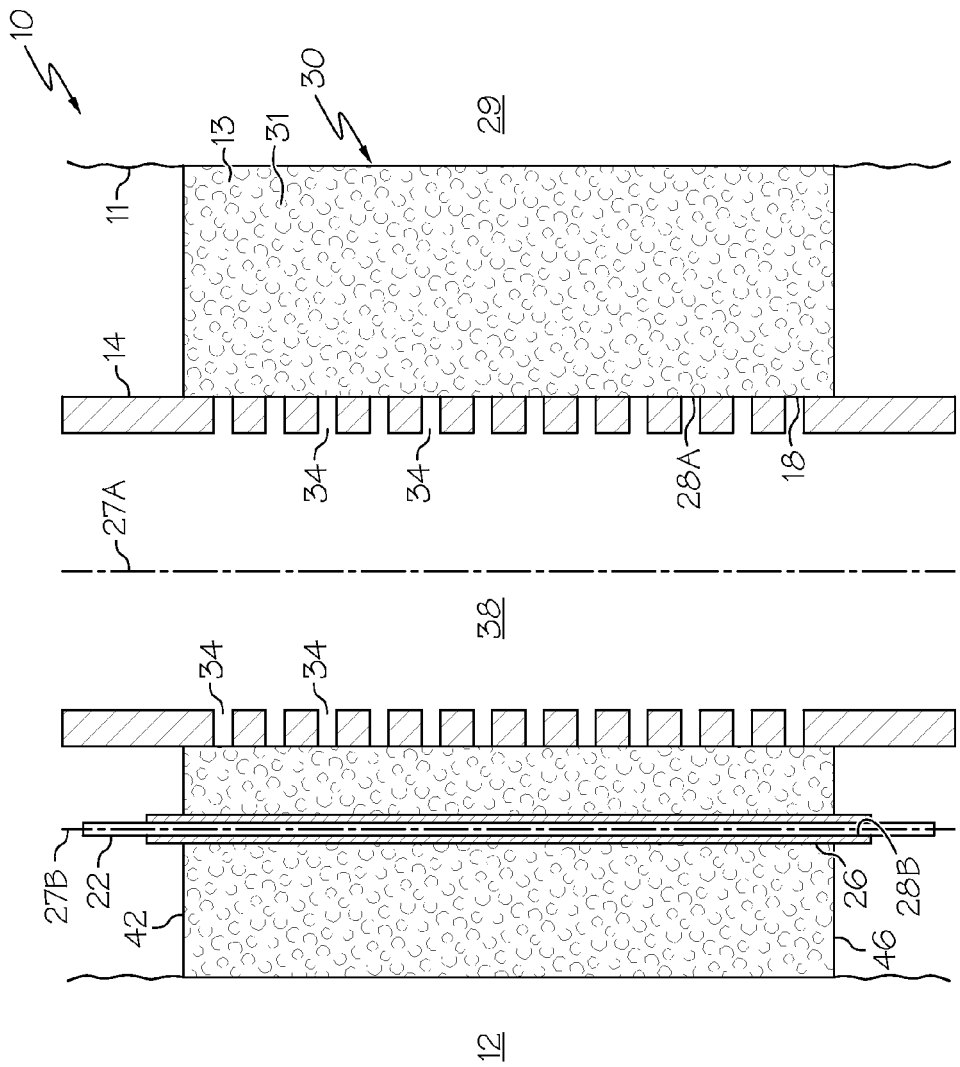
FIG. 1 depicts a cross-sectional view of a screen device disclosed herein.

Referring to FIG. 1, an embodiment of a screen device disclosed herein is shown generally at 10. The screen device 10 is shown within a wellbore 11 of an earth formation 12. The screen device 10 has a foam, which in one iteration is an open cell foam, body 13 that surrounds a tubular 14 positioned within a void 18 that extends longitudinally through the screen device 10. Additionally, a line 22 is shown positioned within a conduit 26 of the screen device 10, also referred to herein as a passageway, that extends longitudinally through the screen device 10. In this embodiment an axis 27A of the void 18 is substantially parallel to an axis 27B of the conduit 26. Both the void 18 and the conduit 26 have perimetrically continuous walls 28A, 28B, which may be either permeable or non-permeable to fluid. The foam body 13 is an open cell structured foam 31 to allow fluid to flow therethrough from an outside 29 of the screen device 10, defined by outer surface 30, to the void 18 for embodiments wherein the walls 28A are permeable. In this embodiment the open cell structured foam 31 provides filtering of fluid passing therethrough. Perforations 34 in the tubular 14 allow fluid passing through the screen device 10 to flow to an inside 38 of the void 18. Once the fluid is on the inside 38 it can flow longitudinally through the tubular 14 in either direction. Fluid initially on the inside 38 can also flow out through the perforations 34, through the open cell structured foam 31 and to the outside 29.

The conduit 26 provides an unobstructed passageway from a first end 42 of the screen device 10 to a second end 46 of the screen device 10. As mentioned above, the walls 28B of the conduit 26 may be permeable so that fluid is able to pass therethrough in either direction between the open cell structured foam 31 and the conduit 26. An embodiment wherein the walls 28B are permeable permits treatments therethrough. For example, chemical injection for treating the open cell structured foam 31 or the earth formation 12, such as for acid treatments or corrosion inhibitor treatments.

The anticipated treatments and environmental conditions in which the screen device 10 will be operational will influence materials used to construct the foam body 13. Additional considerations include whether or not the foam body 13 needs to be deformable or not. As such, materials contemplated for the foam body 13 include resins, polyolefins, polyurethanes, polyvinylchlorides, metals, ceramics and combinations thereof.

Regardless of the material of the foam body 13, running the line 22 through the conduit 26 provides a means of communicating through the screen device 10. The line 22 can be one or more of several lines commonly used in downhole completion applications, such as, a hydraulic line, an electric line, a fiber optic cable and a chemical injection line, for example.

Figure 2:
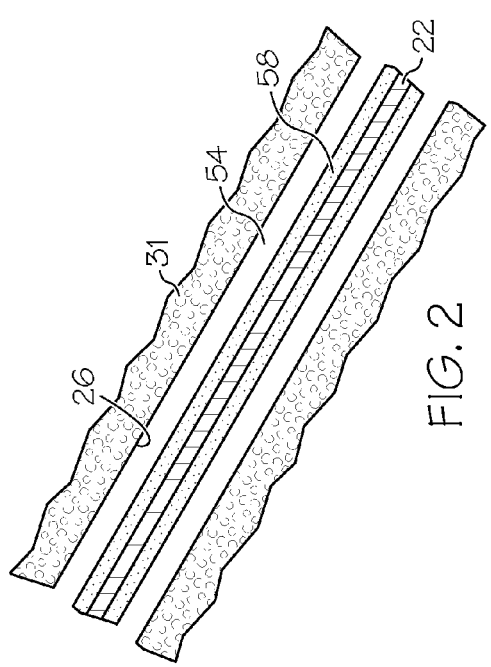
FIG. 2 depicts a side view of the a screen device disclosed herein with a helical conduit.
Figure 3:
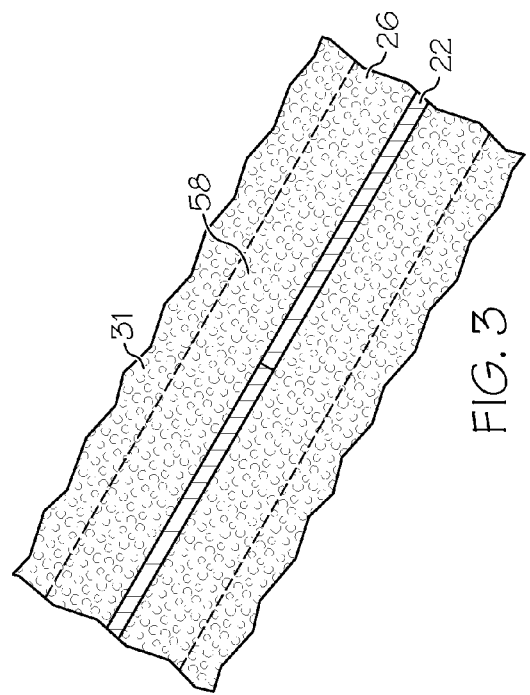
FIG. 3 depicts a partial cross-sectional view of a conduit shown in FIG. 2 with a line running therethrough.

Referring to FIG. 2, the line 22 can be free to slide within the conduit 26 by sizing the line 22 and the conduit 26 with an annular space 54 therebetween. Alternately, the line 22 can be fixedly attached to the conduit 26, as illustrated in FIG. 3. One way to attach the line 22 to the conduit 26 is to surround the line 22 with a foam 58 that is radially small enough to be run into the conduit 26 prior to expansion of the foam 58 and subsequent adhesion to the walls 28B. The foam 58 can be compacted or fabricated to a smaller radial dimension prior to running through the conduit 26. The foam 58 can further be configured to expand radially in response to exposure to such things as temperature or chemical exposure, for example, that the foam 58 is anticipated to encounter once placed in application.

Figure 4:
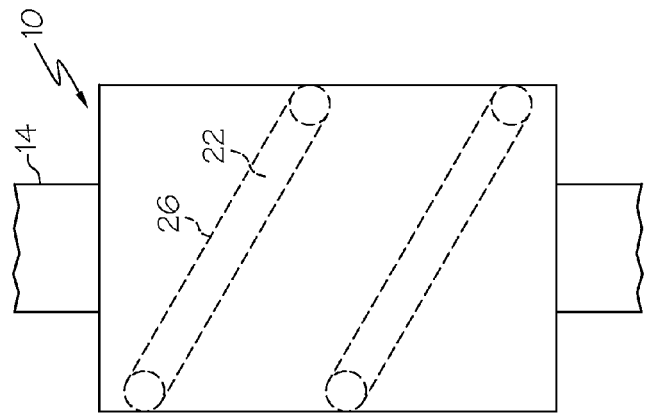
FIG. 4 depicts a partial cross-sectional view of an alternate conduit with a line running therethrough.

Referring to FIG. 4, attachment of the line 22 to the conduit 26 can be used to sense parameters of the screen device 10. For example, use of fiber optic cable as the line 22 permits measurement of stresses encountered by the screen device 10.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A screen device comprising a foam body having a passageway and a void that both extend longitudinally through the foam body, the foam body having an open cell structure such that at least two surfaces of the foam body are in fluidic communication with one another through the foam body, the passageway and the void each having separate perimetrically continuous walls formed in the foam the perimetrically continuous wall of the passageway defining a non-fluid permeable barrier.

2. The screen device of claim 1, wherein one of the at least two surfaces defines a wall of the void in the foam body.

3. The screen device of claim 2, wherein the void is receptive to a perforated tubular.

4. The screen device of claim 2, wherein the passageway is helically spiraled about the void.

5. The screen device of claim 2, wherein the foam body surrounds the void and an inside of the void and an outside of the foam body are in fluidic communication through the open cell structure.

6. The screen device of claim 1, wherein a longitudinal axis of the passageway is substantially parallel to a longitudinal axis of the foam body.

7. The screen device of claim 1, wherein the foam body defines a tubular.

8. The screen device of claim 1, wherein the foam body is positioned on a downhole tool string and the passageway forms a conduit receptive to a line.

9. The screen device of claim 8, wherein the line is at least one of a hydraulic line, an electric line, a fiber optic cable and a chemical injection line.

10. The screen device of claim 1, wherein the passageway and the void are parallel to one another yet are not coaxial.

11. A downhole screen, comprising:
a foam body having a passageway and a void extending therethrough, the foam body defining perimetrically continuous walls of both the passageway and the void, the foam body having an open cell structure providing fluidic communication between an outer surface of the foam body and an inside of the void;
a tubular having a wall with perforations therethrough extending longitudinally through the void; and
a conduit extending longitudinally through the passageway, wherein each of the perimetrically continuous walls defining the passageway and the conduit being permeable to fluid.

12. The downhole screen of claim 11, wherein the conduit helically surrounds the tubular.

13. The downhole screen of claim 11, wherein an axis of the conduit is substantially parallel with an axis of the foam body.

14. The downhole screen of claim 11, further comprising a line running through the conduit.

15. The downhole screen of claim 14, wherein the line is fixedly attached to the foam body.

16. The downhole screen of claim 14, wherein the line is slidably engaged with the foam body.

17. The downhole screen of claim 14, wherein the line is one of a hydraulic control line, an electric line, a fiber optic cable and a chemical injection line.

18. The downhole screen of claim 11, wherein the foam body is constructed of resins, polyolefins, polyurethanes, polyvinylchlorides, metals, ceramics and combinations thereof.

19. A screen device comprising a foam body having a passageway and a void that both extend longitudinally through the foam body, the foam body having an open cell structure such that at least two surfaces of the foam body are in fluidic communication with one another through the foam body, the passageway and the void each having separate perimetrically continuous walls formed in the foam, wherein the passageway is entirely surrounded by the foam body.

* * * * *